(12) United States Patent
Zimmer et al.

(10) Patent No.: US 10,844,985 B2
(45) Date of Patent: Nov. 24, 2020

(54) CONNECTION PIECE FOR CONNECTING A SURFACE-STRUCTURED END OF AN HOSE TO A FLUID OUTLET AND METHOD OF USE

(71) Applicant: A.RAYMOND ET CIE. SCS, Grenoble (FR)

(72) Inventors: Jochen Zimmer, Görwihl (DE); Patrick Böhler, Lörrach (DE); Karl Bode, Lörrach (DE); Armin Reinacher, Weil am Rhein (DE)

(73) Assignee: A. Raymond et Cie, Grenoble (FR)

( * ) Notice: Subject to any disclaimer, the term of this patent is extended or adjusted under 35 U.S.C. 154(b) by 331 days.

(21) Appl. No.: 15/568,249

(22) PCT Filed: Apr. 19, 2016

(86) PCT No.: PCT/EP2016/000636
§ 371 (c)(1),
(2) Date: Oct. 20, 2017

(87) PCT Pub. No.: WO2016/169648
PCT Pub. Date: Oct. 27, 2016

(65) Prior Publication Data
US 2018/0142818 A1    May 24, 2018

(30) Foreign Application Priority Data

Apr. 20, 2015   (DE) .................... 20 2015 002 815 U
Apr. 21, 2015   (DE) .................... 20 2015 002 874 U (51) Int. Cl.
*F16L 33/34*     (2006.01)
*F16L 25/00*     (2006.01)
(Continued)

(52) U.S. Cl.
CPC ............. *F16L 25/0036* (2013.01); *B60S 1/48* (2013.01); *B60S 1/52* (2013.01); *F16L 33/34* (2013.01); *F16L 55/07* (2013.01); *F16L 33/18* (2013.01)

(58) Field of Classification Search
CPC .................................. F16L 33/34; B60S 1/52
(Continued)

(56) References Cited

U.S. PATENT DOCUMENTS 2,685,459 A * 8/1954  Panagrossi ............. F16L 33/26
                                                      285/222.5
4,815,769 A * 3/1989  Hopperdietzel .......... B60S 1/52
                                                      285/41
(Continued)

FOREIGN PATENT DOCUMENTS

CN    101363564 A    2/2009
CN    102809010 A    12/2012
(Continued)

*Primary Examiner* — David Bochna
(74) *Attorney, Agent, or Firm* — Warner Norcross + Judd LLP (57) ABSTRACT

A connection piece for connecting a surface-structured end of a hose extending along a longitudinal direction to a fluid outlet is disclosed, which end comprises at least one recess in its surface, with a sealing space into which the end of the hose can be introduced. A sealing material is arranged in the sealing space, which is sufficiently fluidizable in a first processing state so that a part of the sealing material present in the sealing space can flow into the recess when the end of the hose has been pushed in, and can be hardened in a second processing state.

19 Claims, 7 Drawing Sheets

(51) Int. Cl.
    *B60S 1/52*        (2006.01)
    *F16L 55/07*     (2006.01)
    *B60S 1/48*       (2006.01)
    *F16L 33/18*     (2006.01)

(58) Field of Classification Search
    USPC .......................................... 285/294.3, 296.1
    See application file for complete search history.

(56) References Cited

U.S. PATENT DOCUMENTS

| | | | |
|---|---|---|---|
| 8,419,071 B2 * | 4/2013 | Gentille | F16L 33/01 |
| | | | 285/222.1 |
| 2013/0043676 A1 * | 2/2013 | Baker | F16L 33/34 |
| | | | 285/286.1 |
| 2017/0045163 A1 * | 2/2017 | Popov | F16L 33/34 |
| 2017/0336008 A1 * | 11/2017 | Hankins | F16L 33/34 |

FOREIGN PATENT DOCUMENTS

| | | | | |
|---|---|---|---|---|
| DE | 202010013930 U1 * | 1/2012 | | B60S 1/52 |
| EP | 2025987 | 2/2009 | | |
| WO | 2008131993 | 11/2008 | | |
| WO | 2011095300 | 8/2011 | | |
| WO | WO-2015119777 A1 * | 8/2015 | | B60S 1/52 |
| WO | WO-2016111767 A1 * | 7/2016 | | B60S 1/52 |

\* cited by examiner

CONNECTION PIECE FOR CONNECTING A SURFACE-STRUCTURED END OF AN HOSE TO A FLUID OUTLET AND METHOD OF USE

TECHNICAL FIELD OF THE INVENTION

The invention relates to a connection piece for connecting a surface-structured end of a hose extending along a longitudinal direction to a fluid outlet, which end comprises at least one recess in its surface, a system with such a connection piece and the use for such a connection piece.

BACKGROUND OF THE INVENTION

It is known from the prior art to connect the end of a hose by a connection piece to a fluid outlet, for example a windshield washer nozzle element.

Connection are required in motor vehicles at different locations which connect structural components which guide the fluid. On the one hand, the connection of hoses is achieved by a clamping/screwing connection. On the other hand, hose connections and rapid connectors are used. The flexibility of hoses makes an inseparable connection difficult. In particular, the flexibility of hoses makes a non-positive and sealing connection difficult.

Rubber hoses or corrugated hoses are used in the vehicle for the fluidic connection. As specifically concerns the usage, the connections are to be designed in such a manner that the required pressures can be received. The connection areas of the hoses and the connection piece are especially critical here.

If clamps are not to be used for the fastening for reasons of cost and optical reasons, the hose must be drawn onto the connection pieces with significant pre-tensioning and the material must be selected in such a manner that this tensioning does not significantly diminish during the service life due to the creeping behavior of the material. If this is not ensured, the sealing function is endangered.

Therefore, expensive materials are used in the prior art. For example, they are rubber hoses or relatively thick-walled EPDM hoses.

Various connection techniques are known from the prior art for connecting a pipe to another pipe or to a connection piece.

FR 2 153 947 shows the non-positive connection of two pipes by an adhesive connection. Both pipe ends have a bell-shaped form of the wall with a different cross section. An adhesive is filled in between these walls so that a good sealing connection of two pipes is possible. However, the arrangement of sealing elements between the walls which prevent the adhesive from flowing out before it hardens is obligatorily necessary.

DE 25 12 033 B1 shows the introduction of a powder into the connection area between two metallic pipelines coated with plastic. The powder becomes liquid by heating so that a melting takes place between the plastic coatings of the pipes and the powder. The selected materials must resist the relatively high temperatures necessary for melting the plastic powder.

The using of solid adhesive inserts in connection pieces is known from the prior art. FR 2727347 shows the connection of two corrugated hoses. It is explained in it that the corrugation valleys are filled with plastic cores which enter a firmly bonded connection by heating between the surrounding sleeve and the two hoses, which produces a tight connection.

The connecting of corrugated hoses to each other or the fastening to a connection piece by adhering with adhesive adhesives or by welding adhesives to the structural components is basically undesired because adhering adhesive attacks the firmness of the corrugated hose and corrugated hoses can be exposed to only slight thermal treatments.

Furthermore, the use of corrugated hoses as an insertion system is known from the prior art. Corrugated hoses are provided in the area of the connection with so-called smooth tube ends. These smooth tube ends are pressed onto the corrugated or stepped surface of the connection pieces under a great expenditure of force. The smooth surface of the hose adapts to the corrugated or stepped surface of the connection. Due to the positive surface contact, a good sealing action is achieved. At the same time, it is complex and expensive to automate this procedure. At the same time, only such materials can be used which have a good creep resistance. Therefore, the selection of hose materials is limited. Pressing a corrugated hose without a smooth tube end onto a connection piece does not yield any sufficient seal on account of the geometry.

The smooth tube ends constitute a problem regarding the variable ability to use one hose type for different products on account of the lengths determined during the production of a hose. The fixed interval of the smooth areas to each other during the ordering also results in the unchangeable lengths of corrugated hose between points to be connected. As regards a completely automatic processing of the hoses with several hose pieces, each occurring connection length must be supplied with its own hose type with a specific corrugated-smooth division. This is expensive and frequently can hardly be achieved. Or, a long hose is used which, depending on the type of usage, has a length which is too great so that the hose which is present but not necessary between two connection pieces must be placed and fastened somehow in the car. This results in unnecessary weight and necessitates a high assembly cost. As a result of these circumstances, rubber hoses were used, which are distinctly more expensive and last but not least also heavier.

In particular the saving of weight is becoming increasingly more important in the construction of vehicles.

BRIEF SUMMARY OF THE INVENTION

Given this background, the invention has the basic problem of creating a fluidic connection between a surface-structured hose and a fluid outlet which can be readily managed.

The problem is solved with the subject matter of the coordinate claims. Advantageous embodiments are presented in the subclaims.

The core of the invention is the concept of using this surface in a surface-structured hose structure for fixing the hose onto the connection piece. A sealing material is used
- which is sufficiently fluidizable in a first processing state so that a part of the sealing material present in the sealing space can flow into the recess when the end of the hose is pushed in, and
- is permanently hardened in a second processing state so that the part of the sealing material which flowed into the recess and the remaining part of the sealing material can retain the end of the hose by forcing the sealing material into the recess positively against traction forces acting along the longitudinal axis of the hose in the sealing space.

The part which flowed into the recess hardens together with the remaining part of the sealing material. As a result, the hardened sealing material forms a base body from which projections extend into the recesses (the part which flowed into the recess after the hardening). These projections stand in the way of a movement of the end of the hose along the longitudinal axis of the hose and therefore positively retain the end of the hose. It is to be expected that the positive locking is the predominant reason for the retaining of the end of the hose against traction forces acting along the longitudinal axis of the hose. It is conceivable that the effect achieved by the positive locking is supported by a non-positive locking or a firm locking. It is possible, depending on the geometric construction of the recess, that the recess comprises surface sections that are not vertical to the longitudinal axis of the hose, and that the hardened sealing material comprises corresponding surface sections on its part located in the recess which are not vertical to the longitudinal axis. The non-positive locking can occur between these surface sections which support the retention action of the positive locking. It is conceivable as a supplement or an alternative that adhesions, possibly even a pronounced firm locking occurs between surface sections of the sealing material in the recess and surface sections of the part of the surface of the end of the hose which part forms the recess. Even this would support the retention action is achieved by the positive locking.

The sealing material does not enter in an especially preferred embodiment into a reaction with the surface of the hose (not even with the part of the hose surface limiting the recess. In an especially preferred embodiment of the system according to the invention a part of the hardened sealing material engages into the recess on the surface of the hose and retains the hose end in the sealing space solely on account of the positive locking between the hardened sealing material and the hose.

The concept "surface-structured hose" comprises in the sense of the invention a hose which comprises at least one recess in the surface of the hose end. The recess can extend over a partial circumference of the hose; however, it extends especially preferably at least once around the circumference of the hose end. In particular, several recesses can be provided of the outside of the hose.

The concept "sealing material" comprises in the sense of the invention both fluid, that is, pourable material as well as powdery or granulated but also pasty material which can be filled into a sealing chamber, be fluidized and hardened. In a preferred embodiment the sealing material is a hardenable material which is liquid or powdery before the hardening. This can simplify the handling. The concept "hardening" comprises in the sense of the invention the fact that liquid sealing material hardens or powdery sealing material hardens after liquefying or is melted and hardens thereafter.

A sealing material is understood to be "fluidizable" which is either already liquid in the processing state or is pourable in order to flow into the recess of the hose end, or is sealing material which can be introduced into the recess with the aid of carrier fluids such as, for example, air.

In a preferred embodiment the sealing material is a material which does not enter into any adhesion with the sealing space and/or with the hose since the hose and/or the sealing space can be adversely impacted by an adhesion.

The invention has various advantages over the prior art. On the one hand, the weight can be optimized on account of the optimized length of the hose length. Furthermore, the using of a hose can be provided whose wall thickness has to be selected only on account of the pressure and not on account of the creep resistance. This achieves a lower weight for, e.g. hose chains with lower requirements on the material qualities at the same time. Economical materials can be selected and even recyclable materials can be used. Since the hose does not require any special ends, the using in particular of the same endless corrugated hose for different connection lengths can take place, wherein the hose is cut into the fitting length during the connection.

The positive connection of hose and connection piece by a sealing material yields an especially high strength of the connection. Tests have shown that after the hardening of the sealing material, an inseparable and tight connection between hose and connection piece was produced. The corrugated geometry, which is actually unfavorable for the sealing, proves to be a favorable holding element here by virtue of its undercut function. At the same time, it turns out that the sealed connection position has a higher mechanical strength than the hose itself.

In addition, the connection piece is not loaded by any mechanical stress by the fastening of the hose on the connection piece. This is possible due to the assembly of the hose, which is largely without force. Therefore, the connection has no aging phenomena produced on account of impressed assembly forces.

In a preferred embodiment the sealing space comprises at least one introductory opening for the hose. As a result, a defined area for the introduction of the hose can be created. The introductory opening can be designed, for example, in the form of an introductory hollow cylinder leading to the sealing space into which cylinder the hose end is introduced and which can in particular form a projecting length of the sealing space in order, for example, to surround a greater area of the surface structure of the hose with sealing material. The concept "introductory hollow cylinder" represents in this description other possible embodiments of the introductory opening through which the hose end can be guided into the sealing space. In particular, a casing-shaped element extending away from the walls forming the sealing space is understood as an "introductory hollow cylinder". The latter is used in particular when the walls forming the sealing space are constructed with a low wall thickness. However, even other embodiments are conceivable in which the sealing room is constructed within a more complex structure and the "introductory hollow cylinder" is understood to be, for example, the part of a thicker wall partially limiting the sealing space through which a conduit runs through which the hose end can be introduced into the sealing space.

In a preferred embodiment the sealing space comprises a contact surface for the sealing material with which a positive locking between the sealing material and the sealing space can be achieved which retains the sealing material in the sealing space against a tractive force acting along the longitudinal axis of the hose. The contact surface has a surface normal which forms an angle of approximately 0° to approximately 45° with the push-in direction of the hose end (the longitudinal axis of the introductory hollow cylinder) into the sealing space. This creates a contact surface which is effective when forming the positive locking. It can also be provided that the angle is between approximately 0° and approximately 40°, in particular between approximately 0° and approximately 30°, more preferably between approximately 0° and approximately 20°, and especially preferably between approximately 0° and 10°. The contact surface can be constructed on the wall with the introductory opening but it can also be provided that the contact surface is present in the interior of the sealing space.

In a preferred embodiment the sealing material is formed in such a manner that the sealing material fluidically seals the connection between the hose and the connection piece, and in particular the sealing material rests especially on the front area of the hose. This creates a simple seal. It can also be provided that the hose engages on the front side into a recess. It can be important in this connection that the area around the end of the hose is surrounded by sealing material in order to achieve a complete fluidic seal.

The connection piece according to the invention can comprise a central element on which the hollow cylinder is constructed and onto which the hose end can be pushed in a preferred embodiment. The fluid outlet is especially preferably formed on the central element. An insertion element is known from the prior art of windshield wash water lines which comprises a hollow cylinder onto which a hose end of a windshield wash water line can be pushed. These insertion elements are in some instances constructed as "T-pieces" and comprise two opposite hollow cylinders onto which a hose end of a particular windshield wash water line can be pushed in order to form a nozzle chain, wherein in addition a nozzle can be provided on the insertion element. Such insertion elements can be inserted as the central element in the connection piece according to the invention. Accordingly, the invention makes it possible to surround an insertion element known from the prior art with a housing in which the sealing space is constructed in such a manner that the insertion element is located, with the exception of the nozzle outlet, in the sealing space.

In a preferred embodiment a hollow cylinder arranged in the sealing space is provided onto which the hose end can be pushed, which hollow cylinder comprises an open fluid conduit on the end, which conduit is connected to the fluid outlet. While the end can be pushed onto the hollow cylinder, the hose end is supported during the introduction of the sealing mass into the hose recess. This allows a more precise introduction of the sealing mass into the hose recess. The hollow cylinder can be a truncated hollow cone in order to simplify the pushing on of the end of the hose.

In a preferred embodiment the end of the hose and/or the sealing space is fluidically connected by a conduit to a windshield washer nozzle element. In particular, the fluid conduit in the hollow cylinder inside the sealing space can be connected to the windshield washer nozzle element, through which a fluid can exit. As a result, an additional functionality can be integrated.

In a preferred embodiment the sealing space comprises a filling opening which is open. In an alternative embodiment the sealing space comprises a filling opening which is closed by a cover A large opening and/or an opening without a projecting length makes possible a simpler filling of the sealing material into the sealing space. The filling by an automated process is possible.

In a preferred embodiment the introductory opening and the filling opening are arranged at an angle with one another which can be in particular in the range of approximately 50° to approximately 130°. As a result, the hose can be introduced on a different side of the sealing space than sealing material can be filled into the sealing space.

In a preferred embodiment the connection piece comprises a first introductory opening through which an end of a first hose can be introduced into the sealing space, and comprises a second introductory opening through which an end of a second hose can be introduced into the sealing space. As a result, a nozzle chain can be constructed in the application area of windshield washer devices in order, for example, to arrange several nozzles in series for a windshield washer device. Both introductory openings can be constructed as introductory hollow cylinders.

In a preferred embodiment the introductory openings are arranged on the side of the introductory opening, wherein each hose is introduced at a different side of the sealing space. The arrangement of the introductory openings is advantageously such in the case of two hoses that the introductory openings are formed on opposite sides of the sealing space. This can achieve a linear arrangement. The structural volume can be minimized and also the length can be optimized when connecting several devices to a chain on account of the linear arrangement of the hoses.

The connection piece according to the invention is, taken by itself, already an item that can be sold. Third parties who are in possession of a hose, especially preferably a corrugated hose and/or who can readily acquire them, can realize the advantages of the in particular by adding the connection piece according to the invention.

The invention also creates a system from a connection piece according to the invention and from an end of a hose extending along a longitudinal direction, which end comprises a recess in its surface. In the system the sealing mass is hardened and the part of the sealing material which flowed into the recess and the remaining part of the sealing material positively retain the end of the hose in the sealing space counter to traction forces acting along the longitudinal axis of the hose.

In a preferred embodiment the sealing material completely surrounds the part of the hose end introduced into the sealing space. Embodiments are conceivable in which the sealing material surrounds only a circumferential section of the part of the hose end introduced into the sealing space. However, the positive connection between the sealing material and the hose is improved if the sealing material completely surrounds the part of the hose end which is introduced into the sealing space.

In a preferred embodiment several recesses are constructed as parallel, annular recesses on the hose. In a preferred embodiment a plurality of recesses, in particular more than two, especially preferably more than three are arranged in the sealing space. In a preferred embodiment less than ten recesses are arranged in the sealing space. In a preferred embodiment a plurality of recesses, in particular more than two, especially preferably more than three are arranged in the introductory hollow cylinder. In a preferred embodiment less than ten recesses are arranged in the introductory hollow cylinder.

In a preferred embodiment the recess is constructed as a spiral recess. In a preferred embodiment a plurality of windings of the spiral recess, in particular more than two, especially preferably more than three windings are arranged in the sealing space. In a preferred embodiment less than ten windings are arranged in the sealing space. In a preferred embodiment a plurality of windings of the spiral recess, in particular more than two, especially preferably more than three windings are arranged in the introductory hollow cylinder. In a preferred embodiment less than ten recesses are arranged in the introductory hollow cylinder.

In a preferred embodiment the hose is a corrugated hose, which makes a simple design possible.

In a preferred embodiment a part of the hose comprises an inflexible tube area. Such tubes can, if necessary, be fastened more readily and have different strengths than flexible hose areas.

In an embodiment a hose and a connection piece can be connected in such a manner that the hose extends into the sealing space of the connection piece and is surrounded there by a positive-locking filling element, wherein the hose is formed with a surface contour which is marked on the outside circumference and forms elevations and recesses on the surface, and the connection piece comprises at least one introductory hollow cylinder for a hose, wherein the introductory cylinder extends so widely along the introduced hose that it surrounds at least two elevations and a recess lying between them, wherein the inside diameter $d_{inside\ introductory\ opening}$ of the introductory hollow cylinder is greater than the outside diameter $d_{outside\ hose}$ of the introduced hose, wherein the elevations arranged in the introductory hollow cylinder and the recesses located between them function as a marked labyrinth seal and prevent an exiting of a sealing material. In particular, the sealing space comprises a smooth hollow cylinder arranged in it onto which the hose end is pushed, wherein the outside diameter $d_{outside\ connection\ piece}$ of the hollow cylinder is smaller than or equally as large as the inner diameter $d_{inside\ hose}$ of the hose, wherein the hollow cylinder is hollow inside, forms a conduit and makes possible the flowthrough of fluids from the hose to the fluid outlet. The sealing space can be connected to the introductory hollow cylinder by a through opening. The hose end can extend, coming out from the introductory hollow cylinder, with at least 2 corrugations into the sealing space, wherein the sealing space is constructed in such a manner that the free space around the hose end coming out at least partially from the introductory hollow cylinder into the sealing space becomes larger so that around the hose end the sealing space has a greater hollow space around the hose end then in the introductory hollow cylinder. The sealing space can be opened to another side. The sealing space can be filled with a sealing sealing material, In particular, the sealing sealing material preferably fills up the sealing space in such a manner that the hose part extending into the sealing space is surrounded on all sides, wherein the sealing space is partially or completely filled up with sealing material.

A method is also described:

Method for forming a fluid connection between a surface-structured hose and a connection piece, wherein the hose is pushed into a sealing space of the connection piece, characterized by fixing the hose in the sealing space by a sealing mass on the connection piece and forming a positive lock between the hose and the sealing mass.

The described method can be furthermore characterized by the following aspects:

a. Fluidic sealing of the connection by the sealing material
b. Pushing the hose through an introductory opening into the sealing space
c. Filling the sealing space with sealing material
d. Selecting sealing material which does not enter into any adhesion with the hose and/or the sealing space
e. Selecting a hose with an inner diameter in such a manner that the hose can be pushed onto the connection piece without force, in particular without play

BRIEF DESCRIPTION OF THE SEVERAL VIEWS OF THE DRAWINGS

The invention is explained in detail in the following using an exemplary embodiment shown in the drawings.

In the drawings.

DETAILED DESCRIPTION OF THE INVENTION

The figures show an exemplary embodiment of the system according to the invention with two hoses 10 and a connection piece, wherein the device contains a windshield washer nozzle element. Other embodiments are conceivable.

Figure 1:
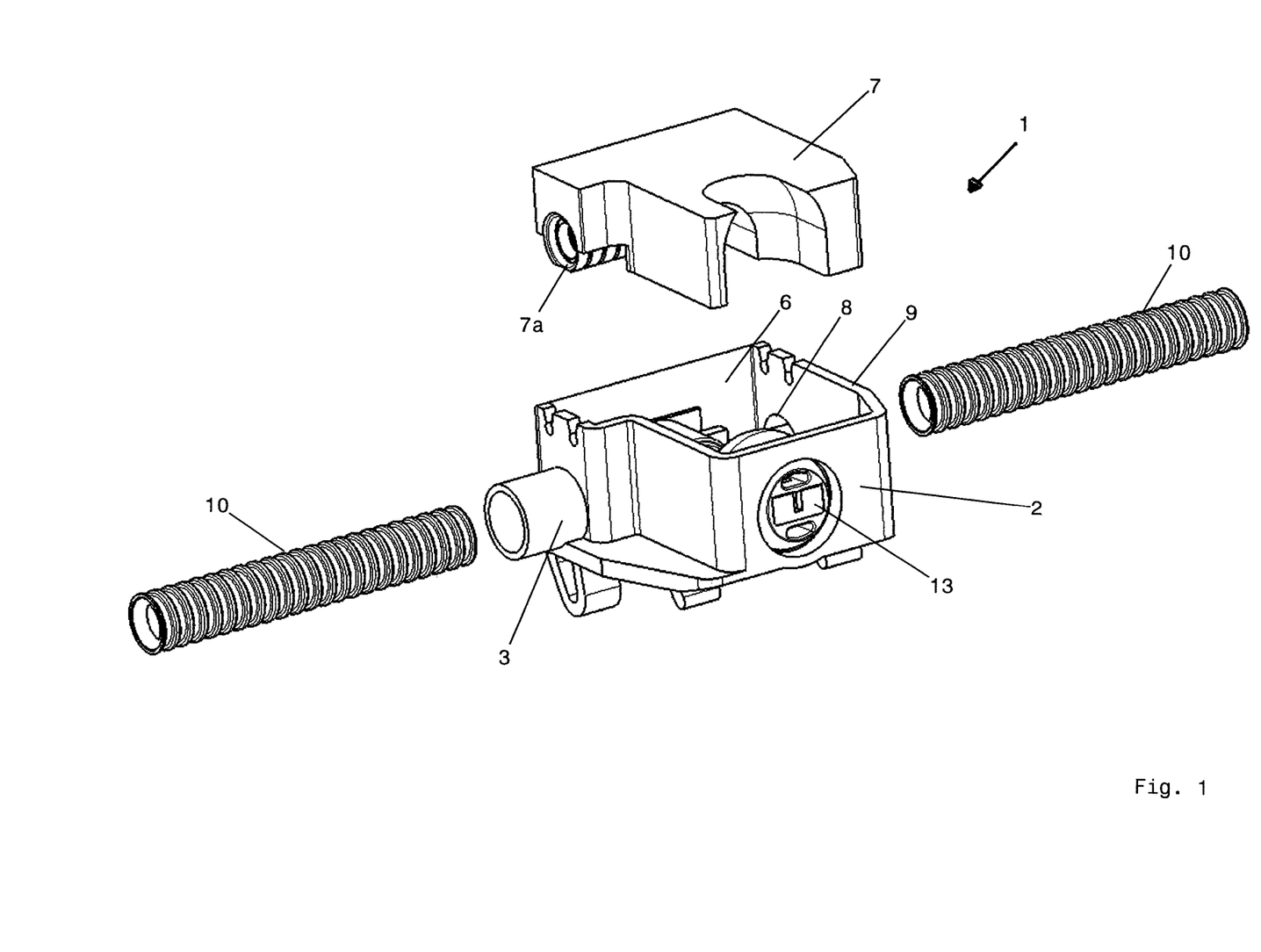
FIG. 1 shows an exploded view of the connection piece, two hoses and sealing material

FIG. 1 shows an exploded view of the connection 1 of the connection piece 2 and two hoses 10 with the aid of a filling material or sealing material 7. The sealing material 7 is shown in its solid final state. The figure also shows in particular that the hose 10 is completely surrounded on the end by the sealing material in the area 7a which ensures the sealing between the hose 10 and the connection piece 2 in the sealing space 6. Furthermore, a casing-shaped introductory hollow cylinder 3 and a through opening 8 between the introductory hollow cylinder 3 and the sealing space 6 can be seen from the figure. A filling opening 9 four filling sealing material 7 on the device 2 is completely open above the sealing space 6. The connection piece 2 comprises a windshield washer nozzle element 13 arranged on the side of the connection piece 2. The openings 3a of the two introductory hollow cylinders 3 are arranged on different sides on the connection piece 2.

Figure 2:
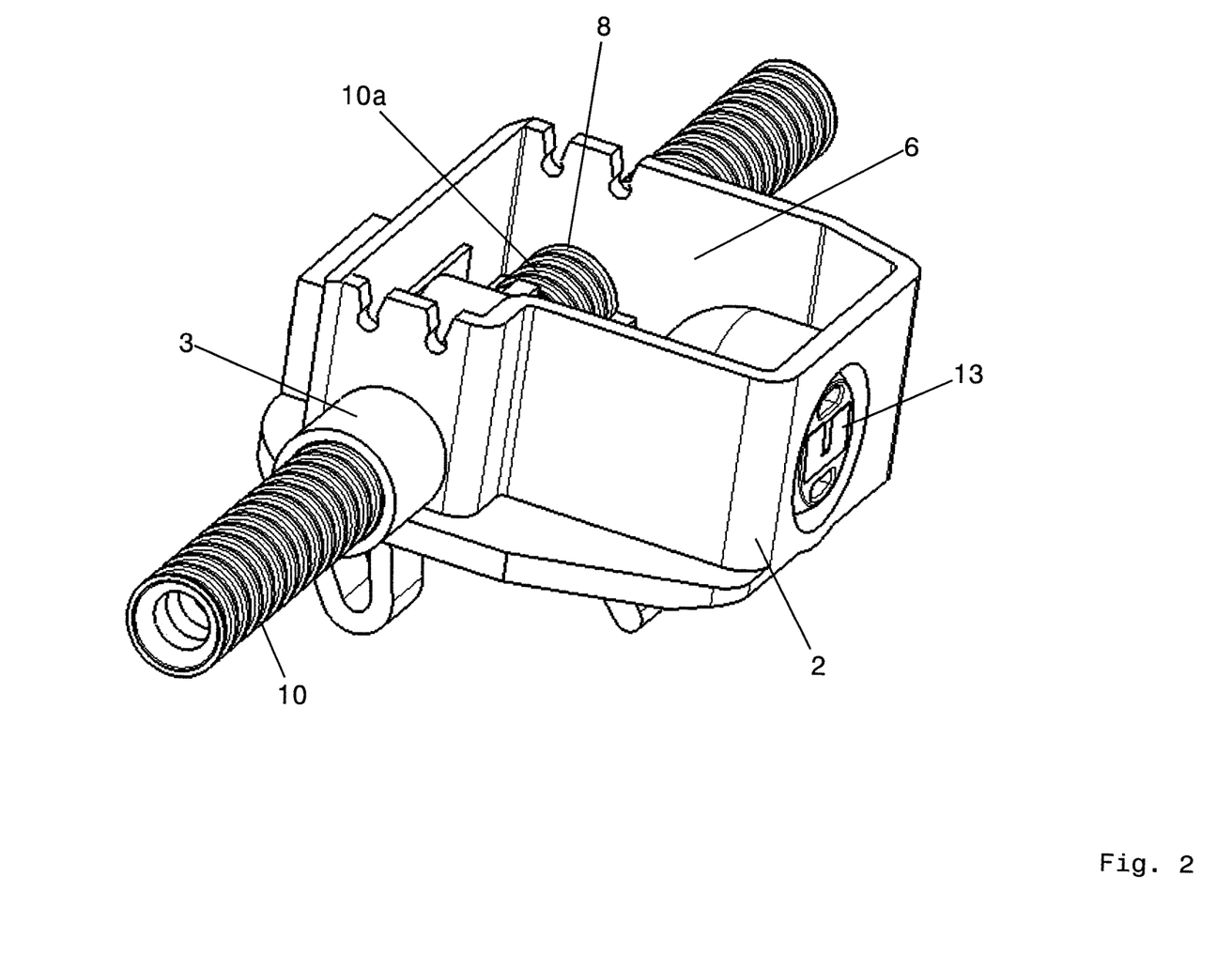
FIG. 2 shows a perspective view of the connection piece and two introduced hoses

FIG. 2 shows the connection between the two hoses 10 and the connection piece 2 without the sealing material 7. A central element 4, covered by hose 10 here, is constructed in accordance with the invention in such a manner that the hose 10 is pushed without play but largely without force onto a hollow cylinder of the central element 4. The hollow cylinder of the central element 4 extends into the casing-shaped introductory hollow cylinder 3. Therefore, the hose 10 lies between the hollow cylinder and the introductory hollow cylinder 3 and the hose end 10a extends through the through opening 8 into the sealing space 6. The drawing also shows the windshield washer nozzle 13 based on the perspective view.

Figure 3:
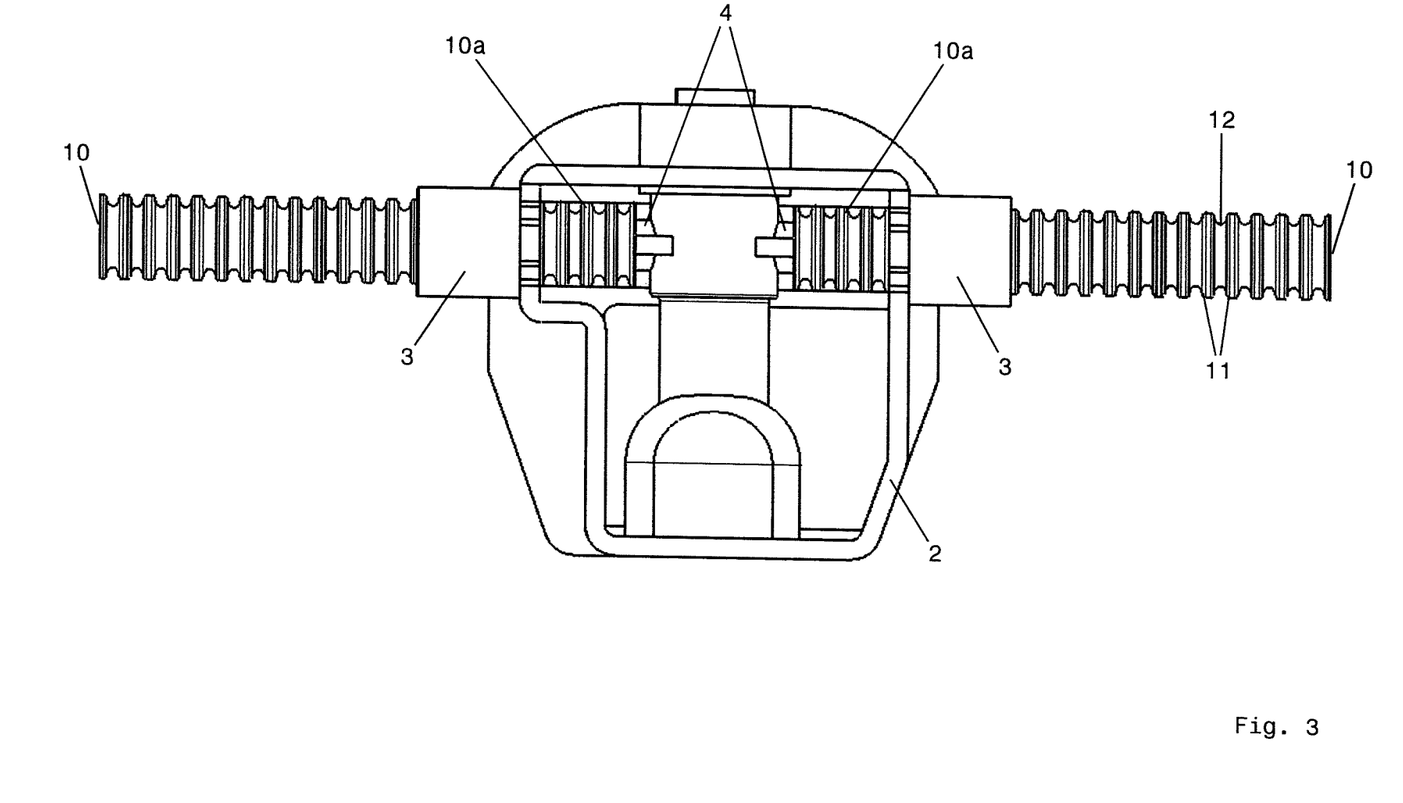
FIG. 3 shows a top view of the connection piece and two introduced hoses FIGS. 4a and b show a perspective view of the connection piece, two introduced hoses and filled-in sealing material

FIG. 3 shows the joined hoses 10 with the connection piece 2. The ends of the hollow cylinders onto which the hoses 10 were pushed before the introducing of the sealing material 7, which is not shown here, can be recognized. The figure shows the running of the hoses 10 through the introductory hollow cylinders 3. The figure shows a recess 12 located between two elevations 11 on the surface of a hose 10. In the sealing space 6, each hose end 10a comprises three elevations 11 and three recesses 12 so that after the filling in of the sealing material 7 a well-sealing and positive, firm connection is present.

Figure 4A:
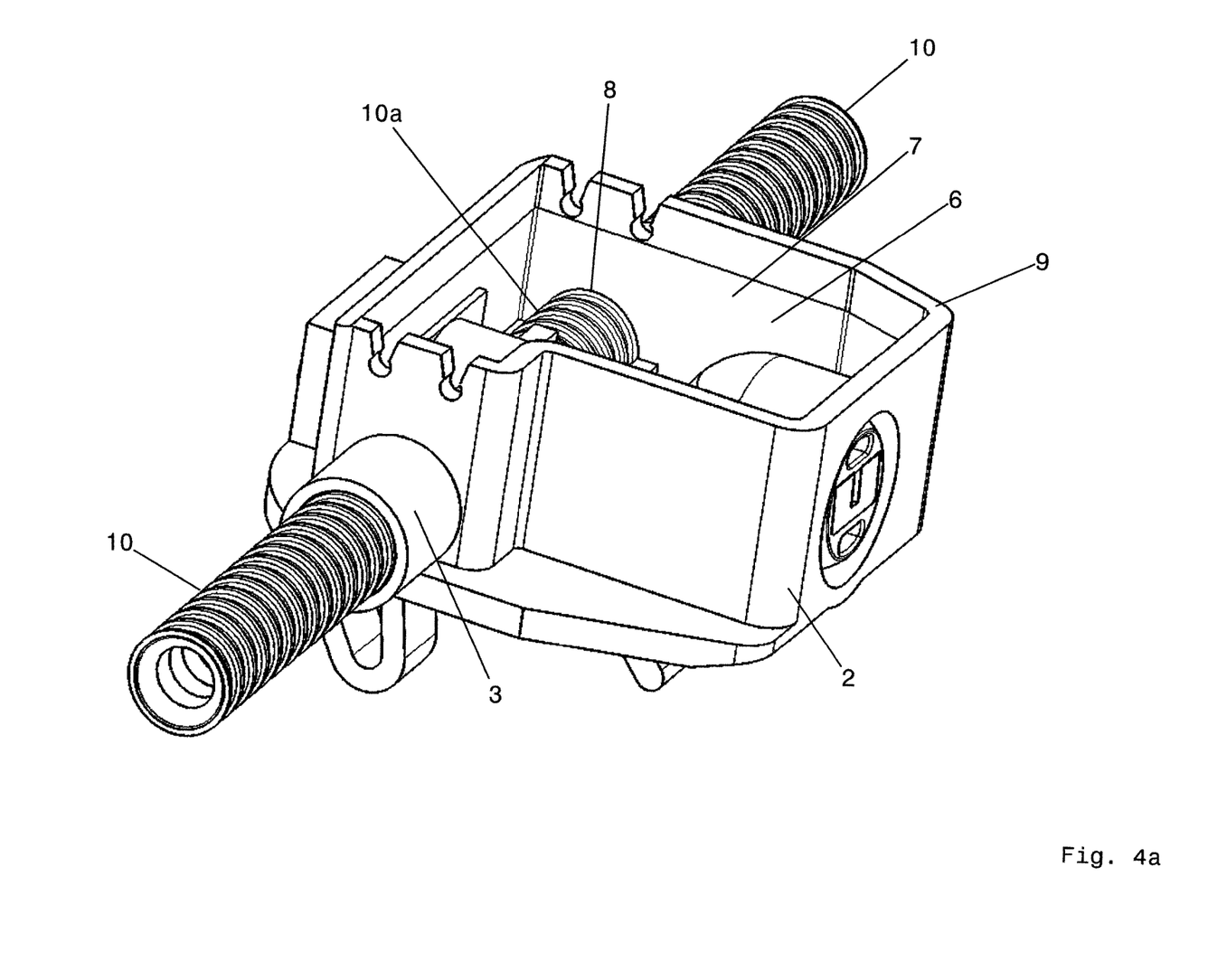

FIG. 4a shows the filling level of the sealing material 7 in the sealing space 6 of the connection piece 2. The sealing material 7 is introduced during the establishing of the connection of hose 10 and connection piece 2 from above through the filling opening 9 into the sealing space 6. This takes place in that the liquid materials are poured in or powdery materials are scattered in. At this time the filling opening 9 is at the top until the hardening of the sealing materials 7 so that the sealing material 7 cannot exit. After the hardening has taken place, the connection piece 2 can be built in at any position. The transparent representation of the sealing material 7 makes it possible to see the through opening 8 through which the hose end 10a of the hose 10 extends into the sealing space 6. The figure also shows that the free space or also hollow space around the outer circumference of the hose 10a coming from the introductory hollow cylinder 3 widens out from a gap 14, which is not shown here (see FIG. 6), to a large space, the sealing space 6. Since a complete surrounding of several elevations 11 and the filling of the recesses 12 takes place in the sealing space 7, there is a sealing and also positively firm connection of hose 10 and connection piece 2.

Figure 4B:
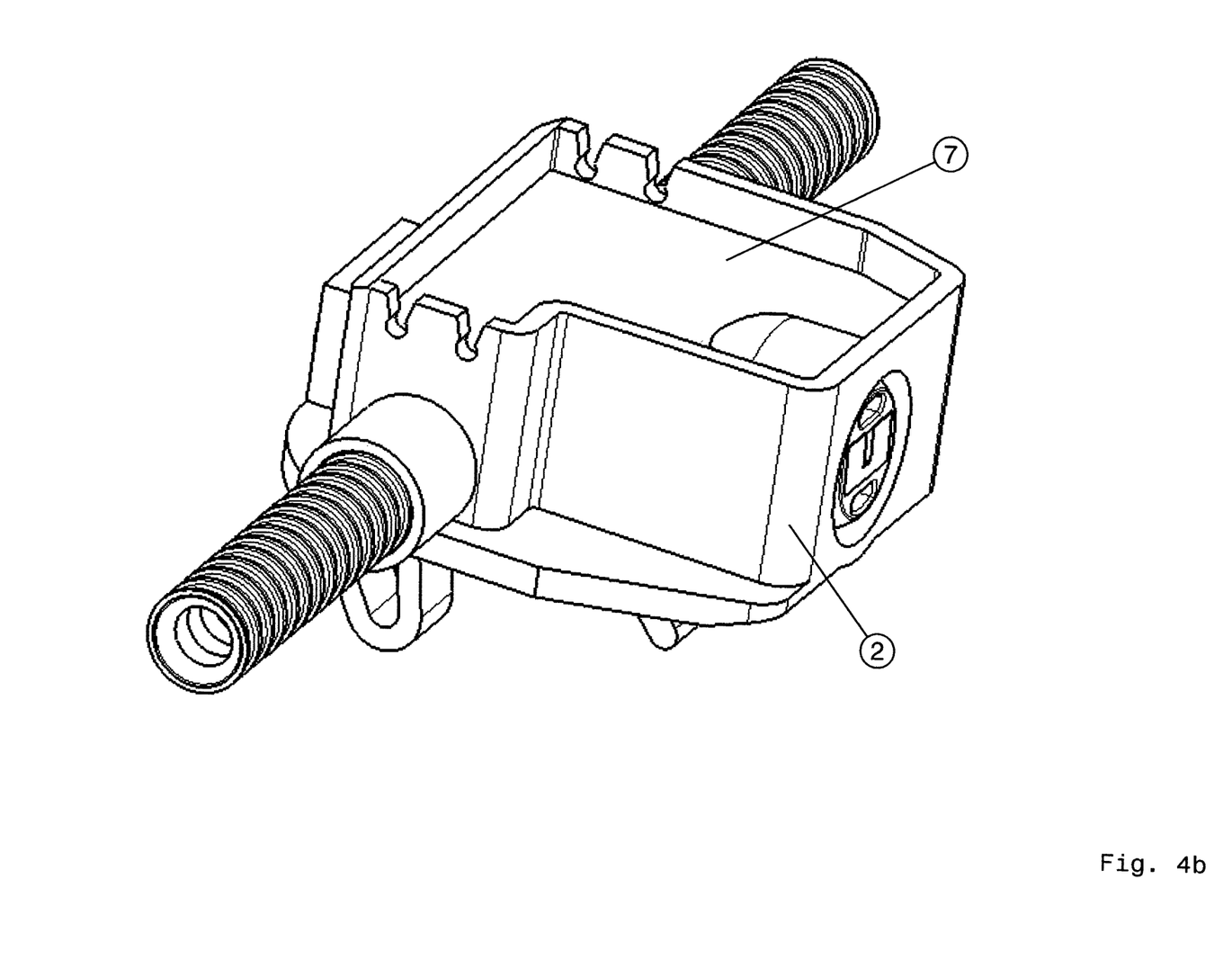

FIG. 4b shows for the sake of completeness the non-transparently represented, filled-in sealing material 7 in the connection piece 2.

Figure 5A:
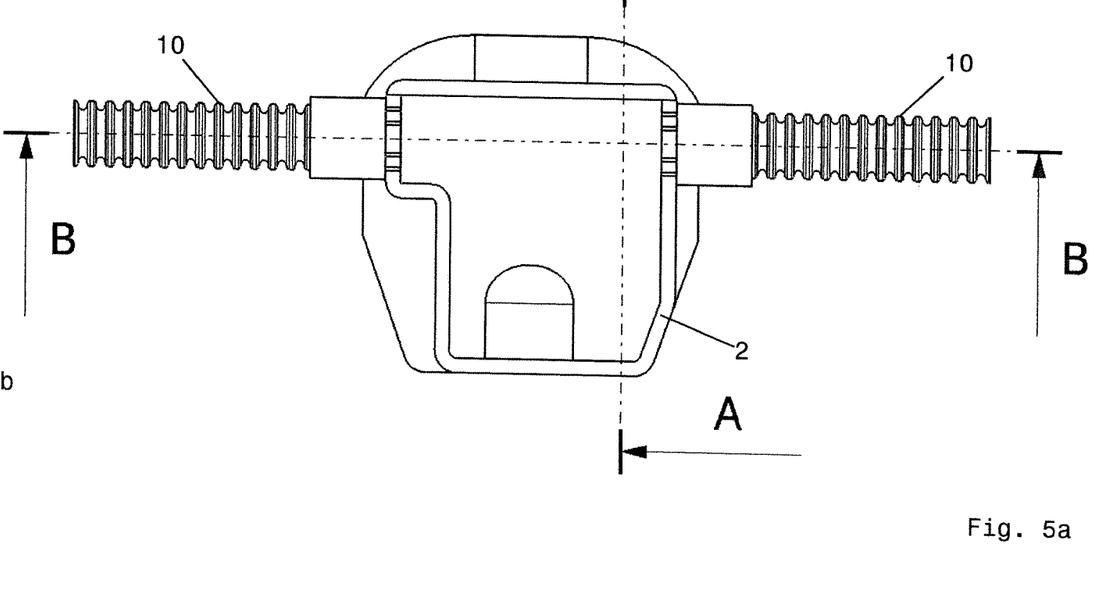
FIG. 5a shows a top view of the connection piece, two hoses and sealing material FIGS. 5b and c show sectional views along section course A-A and B-B in FIG. 5a FIG. 6 shows an enlarged section from the sectional view of FIG. 5c.

FIG. 5a shows a top view of the connection. The sectional courses A-A (FIG. 5b) and B-B (FIG. 5c) can be seen.

Figure 5B:
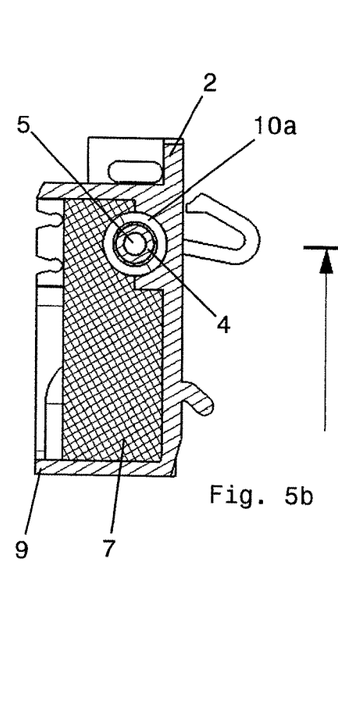
Figure 6:
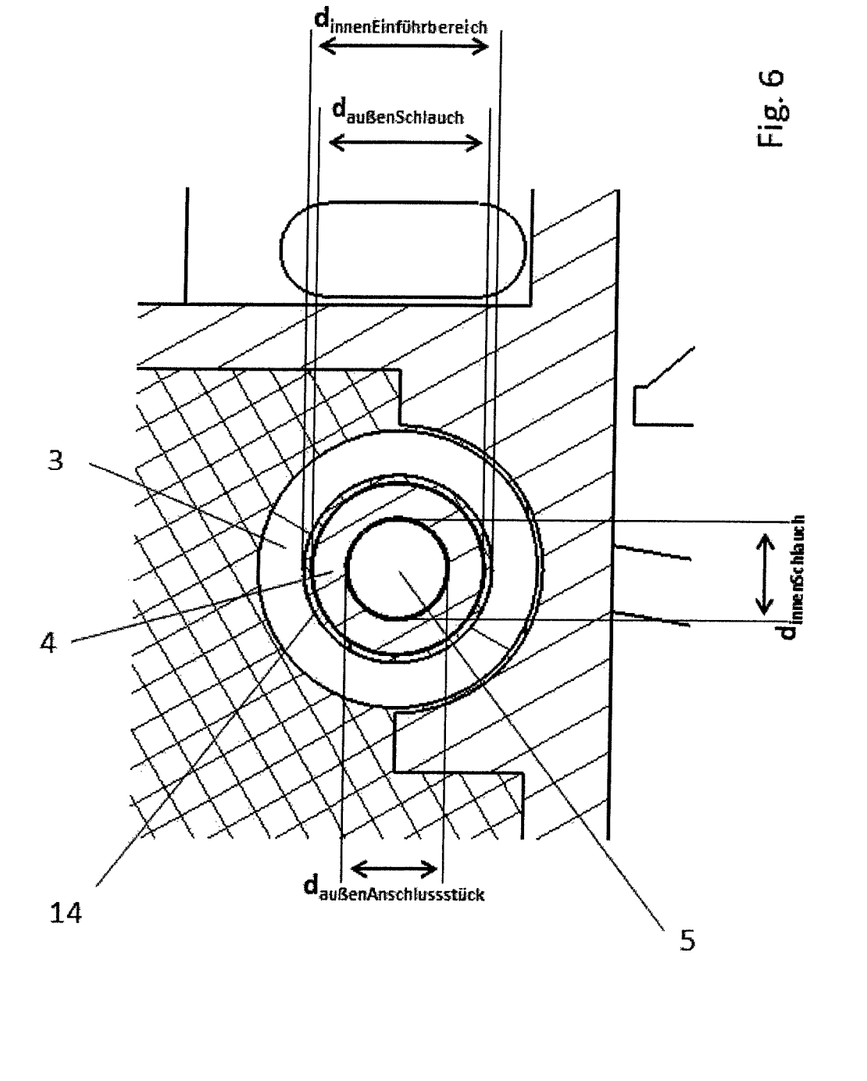

FIG. 5b shows the sectional course A-A from FIG. 5a. An enlarged partial sectional view is shown in FIG. 6. The figure shows the connection piece 2 in the area of the sealing space 6 in section. The sealing material 7 can be seen. The section runs through the conduit 5 and the hose end 10a. The filling opening 8 can also be seen, as well as the circumstance that the sealing material 7 completely covers the hose 10a.

Figure 5C:
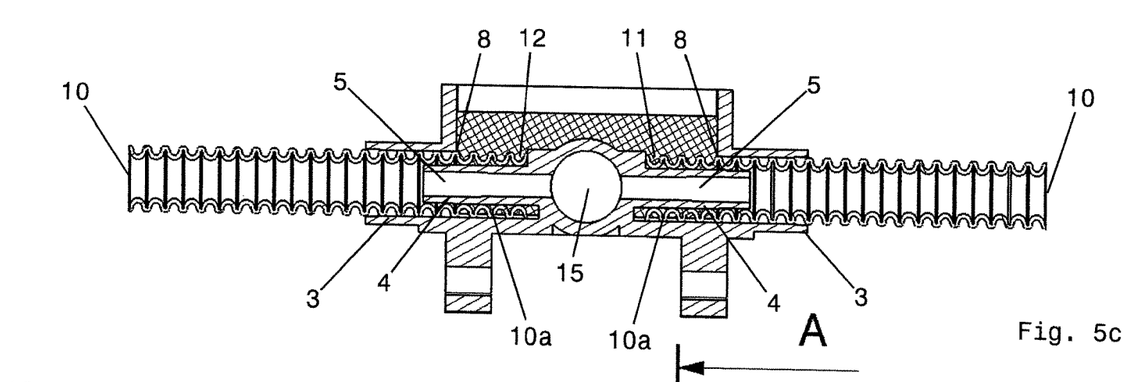

FIG. 5c shows the sectional course B-B from FIG. 5a. The connection piece 2 is sectioned along the course of the conduits 5 of the hollow cylinders of the central element 4. The figure shows the connection of the two conduits so that a passage of fluid is made possible from the one side through a first hose 10, through the associated first conduit 5 through the connection piece 2 to the other side through a second conduit 5 into the second hose 10. At the same time, the connection to the windshield washer nozzle element 13 can be seen viewed together with FIG. 3. The section furthermore shows the introductory hollow cylinders 3 and the passage of the hose ends 10a through the through openings 8 into the sealing space 6. The sealing space 6 is filled with the sealing material 7. The sealing surrounding of the hose end 10a by the sealing material in the area 7a can be seen. The elevations 11 and the particular recess 12 located between them form a partial labyrinth seal in the introductory hollow cylinder 3. Partly because only one half of the so-called cogging of the labyrinth seal is present. The nature of the surface of the hose shown, which is shown here as a corrugated hose, prevents the sealing material 7 from running out through a slot 14, not shown here (see FIG. 6), between hose 10 and the surface of the introductory hollow cylinder 3 in the manufacturing process. During the pouring, material 7 runs (liquid sealing material) or trickles (powdery sealing material), depending on its viscosity, over a certain path into the slot 14, not shown here (see FIG. 6), between hose 10 and the inner surface of the introductory hollow cylinder 3. However, the sealing material is not necessary for the actual sealing. The complete surrounding of the hose end section 10a which is pushed into the sealing space 6 of the connection piece 2 seals the connection.

FIG. 6 shows an enlargement of the sectional view from FIG. 5c. The hollow cylinder of the central element 4 has the outside diameter $d_{outside\ connection\ piece}$. The inside diameter of the hose $d_{inside\ hose}$ is designed in such a manner that the hose 10 can be pushed onto the hollow cylinder 4 without play but largely without force. The hollow cylinder 4 extends into the casing-shaped introductory hollow cylinder 3. The introductory hollow cylinder 3 has the inside diameter $d_{inside\ introductory\ opening}$. Therefore, the hose end of the hose 10 lies between the hollow cylinder of the central element 4 and between the introductory hollow cylinder 3, wherein the hose 10 has the outside diameter $d_{outside\ hose}$. The outside diameter $d_{outside\ hose}$ is smaller than the inside diameter $d_{inside\ introductory\ opening}$ of the introductory hollow cylinder 3. Therefore, a small amount of sealing material 7, not shown here, can enter, if necessary, into the slot 14 between hose 10 and the inside wall of the introductory opening 3.

The above-described hardening of the sealing material can make a heat treatment necessary such as would be the case with powdery sealing material, or it can be optionally used. It is important here that neither the hose nor the connection piece are weakened in a punctiform manner or damaged in areas.

Other embodiments are conceivable. Therefore, a connection of a hose with only one other element is just as possible but is not shown here. It is also possible with the above-described manner to construct a distributor for fluids in which, e.g., three and more hoses meet one connection piece.

The previously described figures show an exemplary embodiment of a connection piece 2 for two hoses 10 into which a windshield washer nozzle element 13 is additionally integrated. This can be used, e.g., to manufacture a nozzle chain consisting of several connection pieces with integrated nozzles and hoses lying between them.

Alternatively, the connection process can be expanded by combining it with the sealing process (not shown), which is necessary in any case for heated windshield washer nozzles. Therefore, in addition to the casting of the heating elements for the nozzles, the hose ends can be cast onto the connection pieces at the same time. However, a casting of the hose ends is also possible independently of the heatings.

The invention claimed is:

1. A connection piece for connecting a surface-structured end of a hose extending along a longitudinal direction to a fluid outlet, which end comprises at least one recess in its surface, defining a sealing space into which the end of the hose can be introduced, and a sealing material arranged in the sealing space, which:
    is sufficiently fluidizable in a first processing state so that a part of the sealing material present in the sealing space can flow into the recess when the end of the hose has been pushed in, and
    can be hardened in a second processing state in order that the part of the sealing material which flowed into the recess and the remaining part of the sealing material can positively retain the end of the hose by the engaging of the sealing material into the recess in the sealing space against traction forces acting along the longitudinal axis of the hose;
    wherein the sealing space is fluidically connected by a conduit to the fluid outlet constructed as a windshield washer nozzle element.

2. The connection piece according to claim 1, comprising a hollow cylinder arranged in the sealing space and onto which the end of the hose can be pushed, wherein the hollow cylinder comprises an open fluid conduit on the end which is connected to the fluid outlet.

3. The connection piece according to claim 2, wherein the sealing material is constructed in such a manner that the sealing material fluidically seals the connection between the end of the hose and the hollow cylinder.

4. The connection piece according to claim 2, wherein the sealing space comprises a contact surface for the sealing material which has a surface normal which encloses an angle of approximately 0° to approximately 45° with the direction of pushing in the end of the hose into the sealing space.

5. The connection piece according to claim 2, wherein the sealing space has a filling opening for sealing material which is open or can be closed by a cover.

6. The connection piece according to claim 2, wherein the sealing material is a material which has no adhesion to walls of the sealing space.

7. The connection piece according to claim 2, comprising a first introductory opening through which an end of a first hose can be introduced into the sealing space, and has a second introductory opening through which an end of a second hose can be introduced into the sealing space.

8. The connection piece according to claim 1, wherein the sealing space comprises a contact surface for the sealing material which has a surface normal which encloses an angle of approximately 0° to approximately 45° with the direction of pushing in the end of the hose into the sealing space.

9. The connection piece according to claim 1, wherein the sealing space has a filling opening for sealing material which is open or can be closed by a cover.

10. The connection piece according to claim 1, wherein the sealing material is a material which has no adhesion to walls of the sealing space.

11. The connection piece according to claim 1, comprising a first introductory opening through which an end of a first hose can be introduced into the sealing space, and a second introductory opening through which an end of a second hose can be introduced into the sealing space.

12. A system comprising a connection piece according to claim 1 and of an end of a hose extending along a longitudinal direction, which end has a recess in its surface, wherein the sealing mass is hardened and that the part of the sealing material which flowed into the recess and the remaining part of the sealing material retain the end of the hose positively in the sealing space against traction forces acting along the longitudinal axis of the hose.

13. The system according to claim 12, comprising several recesses are formed as parallel, annular recesses on the end of the hose.

14. The system according to claim 12, wherein the recess is formed as a spiral recess on the end of the hose.

15. The system according to claim 12, wherein the hose is a corrugated hose.

16. The system according to claim 12, wherein a part of the hose comprises an inflexible tube area.

17. The system according to claim 12, wherein the sealing material is a material which does not enter into any adhesion with the surface of the hose.

18. A method for attaching fluid elements of a vehicle having a windshield, the method comprising:
    forming a windshield washer nozzle element;
    forming a connection piece for connecting a surface-structured end of a hose extending along a longitudinal direction to a fluid outlet, which end comprises at least one recess in its surface, defining a sealing space into which the end of the hose can be introduced, and a sealing material arranged in the sealing space, which is sufficiently fluidizable in a first processing state so that a part of the sealing material present in the sealing space can flow into the recess when the end of the hose has been pushed in, and can be hardened in a second processing state in order that the part of the sealing material which flowed into the recess and the remaining part of the sealing material can positively retain the end of the hose by the engaging of the sealing material into the recess in the sealing space against traction forces acting along the longitudinal axis of the hose; and
    connecting the hose to the windshield nozzle washer element.

19. A connection piece for connecting a surface-structured end of a hose extending along a longitudinal direction to a fluid outlet, which end comprises at least one recess in its surface defining a sealing space into which the end of the hose can be introduced, and a sealing material arranged in the sealing space, which:
    is sufficiently fluidizable in a first processing state so that a part of the sealing material present in the sealing space can flow into the recess when the end of the hose has been pushed in; and
    can be hardened in a second processing state in order that the part of the sealing material which flowed into the recess and the remaining part of the sealing material can positively retain the end of the hose by the engaging of the sealing material into the recess in the sealing space against traction forces acting along the longitudinal axis of the hose; and
    further comprising a hollow cylinder arranged in the sealing space and onto which the end of the hose can be pushed, wherein the hollow cylinder comprises an open fluid conduit on the end which is connected to the fluid outlet;
    wherein the sealing space is fluidically connected by a conduit to the fluid outlet constructed as a windshield washer nozzle element.

* * * * *